July 20, 1943.　　F. R. McFARLAND　　2,324,713
MOTOR VEHICLE
Filed July 29, 1942　　2 Sheets-Sheet 1
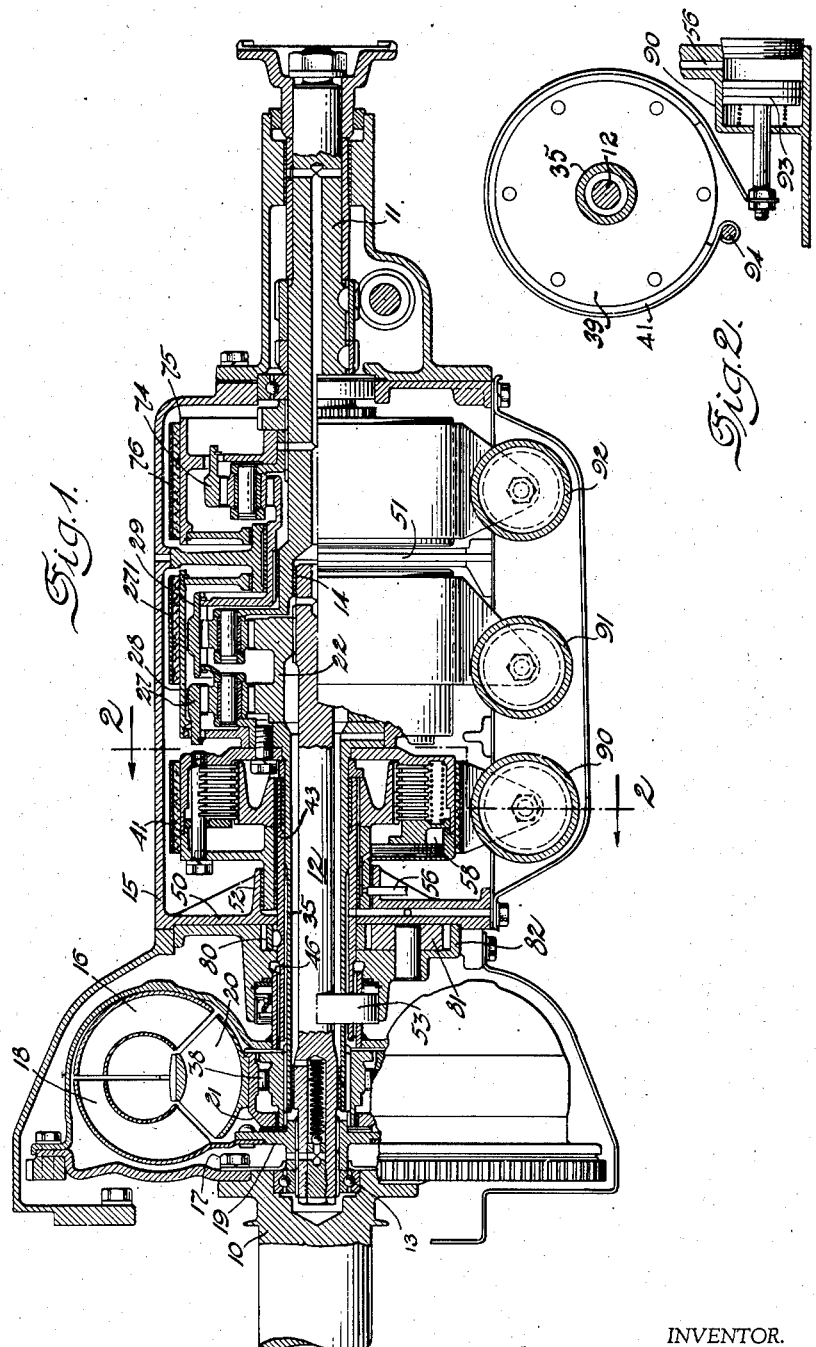
INVENTOR.
Forest R. McFarland
BY Sibbitts & Hart
Attorneys.

July 20, 1943.    F. R. McFARLAND    2,324,713
MOTOR VEHICLE
Filed July 29, 1942    2 Sheets-Sheet 2
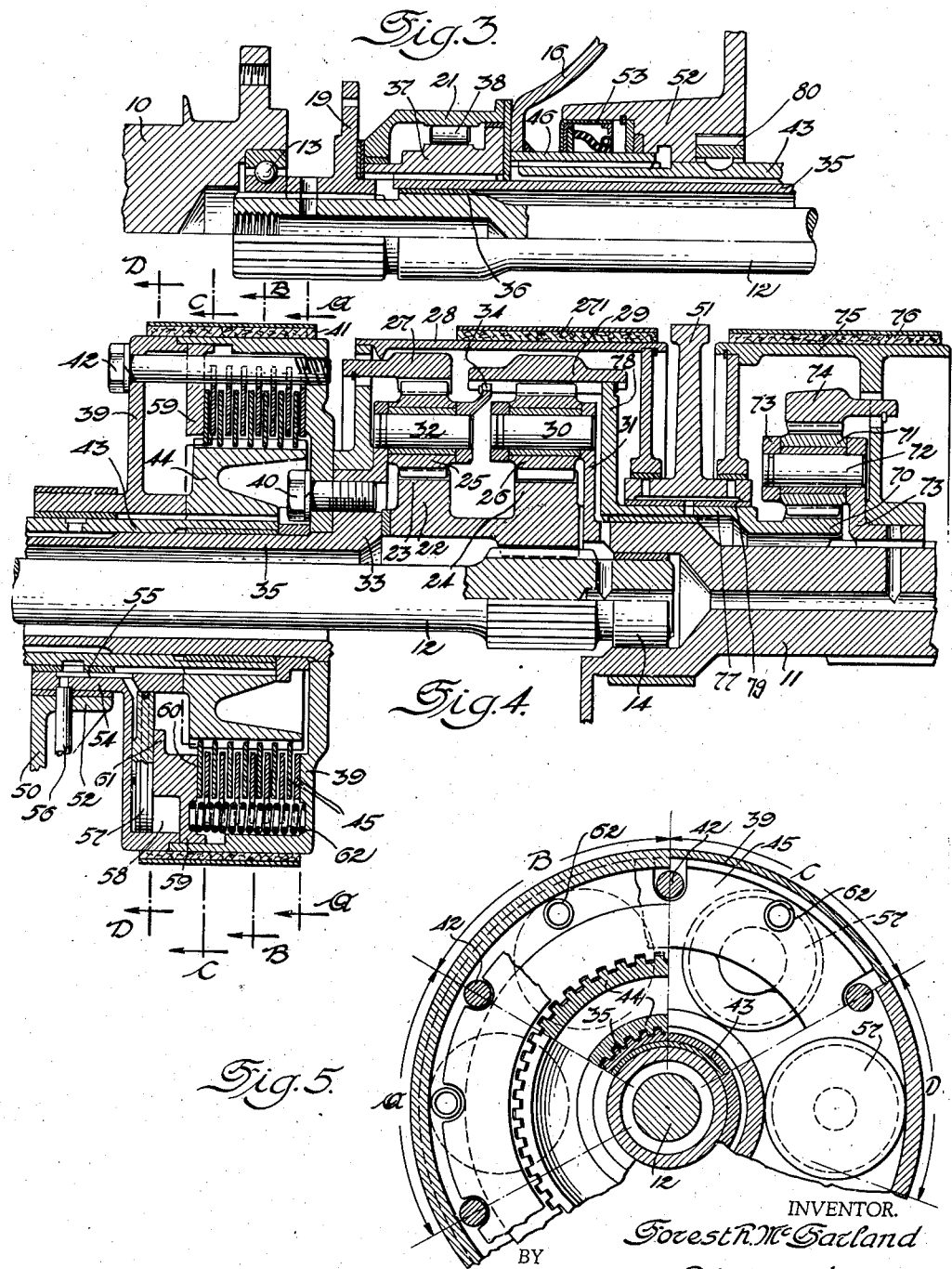
INVENTOR.
Forest R. McFarland
BY Tibbetts & Hart
Attorneys.

Patented July 20, 1943

2,324,713

UNITED STATES PATENT OFFICE 2,324,713

MOTOR VEHICLE

Forest R. McFarland, Huntington Woods, Mich., assignor to Packard Motor Car Company, Detroit, Mich., a corporation of Michigan Application July 29, 1942, Serial No. 452,701

10 Claims. (Cl. 74—189.5)

This invention relates to variable speed drive mechanism of the type including a fluid torque converter and epicyclic gearing.

An object of the invention is to provide a drive mechanism in which a torque converter and a pair of compounded epicyclic gear trains can be controlled to drive in a plurality of forward speeds.

Another object of the invention is to provide a drive mechanism in which an efficient direct drive is obtained from a torque converter without clutching the reaction member to the driving member.

Another object of the invention is to provide a torque converter-epicyclic gearing drive mechanism with which full engine torque will be delivered through the torque converter in lower driving speeds and a portion of the engine torque will be delivered through the torque converter in direct drive.

Other objects of the invention will appear from the following description taken in connection with the drawings, which form a part of this specification, in which:

Fig. 1 is a vertical sectional view through drive mechanism incorporating the invention;

Fig. 2 is a sectional view taken approximately on line 2—2 of Fig. 1 showing one of the brake control devices;

Fig. 3 is an enlarged fragmentary sectional view corresponding to the forward end of the structure shown in Fig. 1;

Fig. 4 is an enlarged fragmentary sectional view corresponding to the rear end of the structure shown in Fig. 1;

Fig. 5 is a sectional view taken on the section lines A—A, B—B, C—C and D—D in Fig. 4.

Referring now to the drawings by characters of reference, drive shaft 10 is the input member and can be connected with a suitable source of power, such as an engine (not shown). Tail shaft 11 is the output member and can be connected with a device to be driven, such as wheels of a motor vehicle (not shown). A driven shaft 12 is arranged between and in alignment with the drive shaft and the tail shaft, the forward end of shaft 12 projecting into a recess in the drive shaft and being carried therein by bearing 13 and the rear end of shaft 12 projecting into a recess in the tail shaft and being carried by bearing 14 mounted therein.

Reverse drive and plural forward speed drives are obtained through a hydraulic torque converter and compounded epicyclic gear trains which are supported and housed in casing 15.

The torque converter can be of conventional design and consists of an impeller member 16 fixed to the drive shaft by bolts 17, a driven member 18 having a hub 19 splined to the forward end of the driven shaft and a reaction member 20 having a hub 21.

Forward speed drive is obtained through a pair of compounded planetary gear trains. Sleeve 22 is splined on the rear end of the driven shaft and has two spaced sun gears 23, 24 formed thereon. Pinions 25 of the forward gear train mesh with sun gear 23 and pinions 26 of the rear gear train mesh with sun gear 24. Ring gear 27 is fixed to drum 28 and meshes with pinions 25, and ring gear 29 meshes with pinions 26. The drum rotation is controlled by brake band 271. The pinions 26 are mounted to rotate on pins 30 supported on a carrier 31, which can be a flanged forward end of the tail shaft, while pinions 25 are mounted to rotate on pins 32 supported on carrier 33. The gear trains are compounded by fixing the carrier 33 to ring gear 29 through means of a splined connection 34.

Carrier 33 has a forwardly extending abutment sleeve 35 supported on bearing 36 on the driven shaft. A hub 37 is splined on the forward end of the sleeve in coaxial relation with hub 21 of the torque converter reaction member and between such hubs is arranged rollers 38. One of the hubs has circularly disposed bearing surfaces for the rollers while the other hub has angularly disposed bearing surfaces so that a one-way driving connection or coupling can be automatically established between the hubs by the rollers. This one-way coupling serves to establish a connection by means of which the reaction member can be held stationary or released. Carrier 33 has an abutment drum 39 fixed thereto by bolts 40 and brake band 41 is anchored at 94 to casing 15 and encircles the drum. The brake band when clamped on the drum will hold the carrier 33 and sleeve 35 stationary, thus providing an abutment on which rollers 38 wedge to hold the converter reaction member stationary.

The drum 39 serves as a housing for a clutch and such housing consists of two sections secured together by bolts 42. A sleeve 43 extends around a portion of sleeve 35 and projects into the drum. Splined to sleeve 43, within the drum, is a peripherally splined hub 44. Clutch plates 45 alternately engage the drum bolts 42 and hub splines to establish drive therebetween when pressed together. The forward end of sleeve 43 is splined to a sleeve 46 fixed to the impeller member of the torque converter.

When the clutch plates are engaged they will transmit a portion of the drive directly from the torque converter impeller member to carrier 33. With the clutch plates disengaged, the drive is transmitted from the torque converter driven member to the driven shaft and the sun gears for the epicyclic gear trains.

Casing 15 has transversely extending walls 50 and 51 therein. Sleeves 35, 43 and shaft 12 extend through a journal bearing 52 formed by wall 50 and a seal 53 is arranged between the wall and sleeve 46. The drum 39 has a forwardly projecting sleeve 54 mounted in bearing 52 and is formed with angularly extending passages 55 leading to a plurality of similar cylinders 56 in the forward end of such drum. Fluid under pressure can pass through conduit 56 in the casing to passages 55 and into the drum cylinders for actuating pistons 57 to press an actuator plate 59 in clutch engaging direction. The actuator plate has a ring boss 60 on one face engaging an end clutch plate and bosses 61 on the other face contacting the pistons. The actuator plate is normally urged to disengaging position by a plurality of coil springs 62.

Reverse drive is obtained through a third planetary gear train compounded with the forward drive gear trains. A sun gear 70 has pinions 71 meshing therewith and these pinions are mounted on pins 72 supported on carrier 73. The pinions mesh with ring gear 74 fixed to drum 75 and rotation of the drum is controlled by brake band 76. The carrier is splined on the tail shaft and the sun gear is provided with a sleeve extension 77 having a flanged forward end 78 fixed to rotate with ring gear 29. The sleeve extension is supported in a journal bearing 79 on wall 51.

The brake bands can be operated by similar mechanisms responsive to fluid pressure controlled by suitable valving controlled to operate as desired. The fluid pressure can be provided by a pump consisting of gears 80 and 81 contained in a housing 82 in the casing and such pump can also be utilized for maintaining pressure in the torque converter. Gear 80 is keyed to sleeve 43 that is driven directly from the drive shaft through the impeller member of the torque converter. Suitable fluid passages in the casing lead from the pump to cylinders 90, 91 and 92 in the casing and in such cylinders are arranged pistons, as indicated by numeral 93, connected to and operable to actuate the three brake bands which are anchored in the casing as indicated at 94.

When brakes 76, 271 and 41 are released and the clutch plates 45 are disengaged, the drive mechanism will be in neutral and no drive will be transmitted to the tail shaft. In all forward speeds, the reverse brake 76 is released so that the reverse gear train will idle. To place the drive mechanism in starting forward speed relation, brake 271 is released, brake 41 is applied and the clutch plates 45 are released. As drum 39 is attached to carrier 33 and sleeve 35, they will be held stationary by brake 41 and ring gear 29 fixed to carrier 33 will be held stationary. The reaction member will be held from reverse rotation because it is coupled to sleeve 35 and the reaction will be taken by the casing through brake 41. The drive will pass from the torque converter driven member to shaft 12 to rotate sun gears 23 and 24. Brake 271, being released, allows the forward gear train to idle and ring gear 29, held stationary by carrier 33, will cause pinions 26 to carry the carrier 31 therewith. The carrier 31 for pinions 26 will thus be rotated and, as the carrier is a part of the tail shaft, the drive will pass to such shaft. The drive reduction through the converter is initially approximately 1.5 to 1, but approaches 1 to 1 as the torque demanded decreases.

When second speed forward drive through the gearing is desired, brake 41 is released, the plate clutch is disengaged and brake 271 is applied so that drum 28 and ring gear 27, fixed to the drum, will be held stationary. The drive will pass from the torque converter driven member to shaft 12 and to the sun gear sleeve 22 fixed to such shaft. As ring gear 27 is held stationary, pinion carrier 33 is driven forwardly by pinions 25 at a reduced speed from sun gear 23 and will drive the reaction member forwardly therewith. Reaction of the reaction member is taken by planet gear carrier 33 and is taken by casing 15 through the ring gear 27, drum 28 and brake 271. Ring gear 29 is driven forwardly by carrier 33 and pinions 26 are driven forwardly by the ring gear and sun gear 24. These two speeds combine to rotate carrier 31 at a higher speed than is developed in starting speed gear relation.

When third speed forward or direct drive is desired, brakes 41 and 271 are released and clutch plates 45 are engaged. The abutment sleeve 35 will be held with sleeve 43 through engagement of the clutch plates to change the torque converter into a fluid coupling, the abutment sleeve being held with the converter reaction member through the one-way coupling. Drive will be from the driven member of the fluid coupling to shaft 12 which will rotate sun gears 25 and 26. As gear 29 and pinions 25 are driven through clutch engagement at the same speed as the sun gears are rotated by shaft 12, the tail shaft will be driven at engine speed except for slippage in the fluid coupling. The reaction is taken by the clutch.

To obtain reverse drive, brakes 41 and 271 are released, the plate clutch is disengaged and brake 76 is applied to drum 75. The drive will be from the converter driven member and shaft 12 to sun gear sleeve 22. The reaction member is free to be driven reversely and through the one-way drive connection with sleeves 35 will operate carrier 33 and ring gear 29 therewith. Reaction from sleeve 22 through planetary pinions 26 will drive them reversely as the integral carrier and tail shaft are stationary to start with. Sleeve 22 also tends to drive the tail shaft forwardly through pinions 26. Sun gear 70 drives pinions 71 through reaction on gear 74, which is held stationary, in reverse at reduced speed. Due to torque coming from pinions 71 in reverse drive being greater than torque on shaft 11 in forward direction, shaft 11 will be driven reversely at reduced speed.

As previously stated, any suitable means can be provided for controlling the fluid pressure for applying the brakes and engaging the plate clutch. It will be seen that the abutment of the converter reaction member reacts against the transmission case in starting speed, against the pinion carrier of the forward gear train in second speed, and is locked to the driven shaft in direct drive. The three forward speeds described are actually second, third and fourth speeds due to the torque converter action. This arrangement of gearing avoids clutching of the reaction member to the driving member in the torque converter to obtain an efficient direct drive. The arrangement when in direct drive or third speed provides, in effect, a fluid coupling drive and in second speed alters the characteristics of the torque converter toward that of a fluid coupling. The torque converter has the feature of taking full engine torque in the two lower forward speeds and approximately only 40% of engine torque in direct drive. As a result, there will be a smooth starting drive and a minimum slippage in direct drive.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. Variable speed drive mechanism comprising a drive shaft; a tail shaft; a driven shaft intermediate the drive shaft and the tail shaft; a fluid torque converter having an impeller fixed to the drive shaft, a driven member fixed to the driven shaft and a reaction member; a reaction sleeve; one-way driving means for connecting the reaction sleeve with the reaction member; an epicyclic gear train having a pinion carrier fixed to the abutment sleeve, a sun gear fixed to the driven shaft, a ring gear and pinions engaging the sun and ring gears; a drum fixed to the carrier; anchored brake means operable to engage and hold the drum; a drive sleeve connected to rotate with the converter impeller member; clutch means operable to connect the drum with the drive sleeve rotating with the impeller member; a drum to which the ring gear is fixed; anchored brake means operable to engage and hold the ring gear carrying drum; a second epicyclic gear train having a sun gear fixed to the driven shaft, a pinion carrier fixed to the tail shaft, a ring gear fixed to the first mentioned carrier, and pinions engaging the ring gear and sun gear in the second gear train.

2. A variable speed drive mechanism comprising a tail shaft, a driven shaft, a power-operated fluid torque converter having impeller, reaction and driven members, said driven member being fixed to the driven shaft, an abutment sleeve, a one-way coupling for connecting the sleeve with the reaction member, epicyclic gearing connected with the driven shaft, the tail shaft and the reaction sleeve, abutment means operable to hold or release the sleeve, and means including a clutch operable to lock the sleeve and the impeller member to rotate together.

3. A variable speed drive mechanism comprising a tail shaft, a driven shaft, a power-operated fluid torque converter having impeller, reaction and driven members, said driven member being fixed to the driven shaft, an abutment sleeve, a one-way coupling for connecting the sleeve with the reaction member, planetary gearing having a sun gear fixed to the driven shaft and a pinion carrier in driving relation with the tail shaft and fixed to the abutment sleeve, abutment means operable to hold or release the carrier, and means including a clutch operable to connect the impeller member in direct driving relation with the carrier and the sleeve.

4. A variable speed drive mechanism comprising a driven shaft, a tail shaft, a power-operated fluid torque converter having impeller, reaction and driven members, said driven member being fixed to the driven shaft, a sleeve, a one-way coupling for connecting the sleeve and reaction member together, planetary gearing having a sun gear fixed to the driven shaft and a pinion carrier in driving relation with the tail shaft and fixed to the sleeve, an abutment drum fixed to the carrier, means operable to hold or release the drum, a sleeve fixed to rotate with the impeller member, and a clutch for drivingly connecting the sleeve fixed to the impeller member with the drum.

5. A variable speed drive mechanism comprising a driven shaft, a tail shaft, a power-operated fluid torque converter having impeller, reaction and driven members, said driven member being fixed to the driven shaft, a sleeve on the driven shaft, a one-way coupling for connecting the sleeve and the reaction member, planetary gearing having a sun gear fixed to the driven shaft and a pinion carrier in driving relation with the tail shaft and fixed to the sleeve, an abutment drum fixed to the carrier, an anchored brake for holding or releasing said drum, a sleeve rotatably mounted on the first mentioned sleeve fixed to rotate with the impeller member and projecting into the drum, normally disengaged clutch plates engaging the drum and the sleeve projecting therein, and power means operable to engage said clutch plates.

6. A variable speed drive mechanism comprising a tail shaft; a driven shaft; a power-operated fluid torque converter having impeller, reaction and driven members, said driven member being fixed to the driven shaft; an abutment sleeve; a one-way coupling for connecting the sleeve with the reaction member; compounded front and rear planetary gear trains having sun gears fixed to the driven shaft, ring gears, a forward pinion carrier fixed to the sleeve, and a rear pinion carrier fixed to the tail shaft and to the ring gear of the forward gear train; means for holding the forward carrier; means for holding the forward ring gear; and clutch means for connecting the forward carrier with the torque converter impeller member.

7. A variable speed drive mechanism comprising a tail shaft; a driven shaft; a power-operated fluid torque converter having impeller, reaction and driven members, said driven member being fixed to the driven shaft; an abutment sleeve; a one-way coupling for connecting the sleeve with the reaction member; compounded front and rear planetary gear trains having sun gears fixed to the driven shaft, ring gears, a forward pinion carrier fixed to the sleeve, and a rear pinion carrier fixed to the tail shaft and to the ring gear of the forward gear train; abutment means fixed to the forward carrier; an anchored brake for holding the abutment means stationary; a clutch operable to directly connect the abutment means with the impeller member; and means operable to hold the forward ring gear stationary.

8. A variable speed drive mechanism comprising a tail shaft; a driven shaft; a power-operated fluid torque converter having impeller, reaction and driven members, said driven member being fixed to the driven shaft; an abutment sleeve; a one-way coupling for connecting the sleeve with the reaction member; compounded front and rear planetary gear trains having sun gears fixed to the driven shaft, ring gears, a forward pinion carrier fixed to the sleeve, and a rear pinion carrier fixed to the tail shaft and to the ring gear of the forward gear train; a drum fixed to the forward carrier; an anchored brake for holding or releasing said drum; means for holding or releasing said front ring gear; and a power-actuated clutch for connecting said drum in direct drive relation with the impeller member.

9. A variable speed drive mechanism comprising a tail shaft; a driven shaft; a power-operated fluid torque converter having impeller, reaction and driven members, said driven member being fixed to the driven shaft; an abutment sleeve; a one-way coupling for connecting the sleeve with the reaction member; two compounded planetary gear trains having sun gears fixed to the driven shaft, ring gears, a pinion carrier fixed to the sleeve, and another pinion carrier fixed to the tail shaft and to the ring gear of the other gear train; means for holding the forward carrier; means for holding the forward ring gear; and means for fixing the forward carrier to rotate with the impeller member, the drive passing partially through the forward carrier from the impeller member and partially through the driven shaft from the driven member to the planetary gearing when the forward carrier is fixed to rotate with the impeller member and the holding means are released.

10. A variable speed driven mechanism comprising a casing; a tail shaft; a driven shaft; a power-operated fluid torque converter having impeller, reaction and driven members, said driven member being fixed to the driven shaft; an abutment sleeve; a one-way coupling for connecting the sleeve with the reaction member; two compounded planetary gear trains having sun gears fixed to the driven shaft, ring gears, a pinion carrier fixed to the sleeve, and another pinion carrier fixed to the tail shaft and to the ring gear of the other gear train; means operable to hold the forward carrier stationary; means operable to hold the forward ring gear stationary, the reaction being taken by the casing when the ring and carrier holding means are operative, but such means being operable only one at a time; and means for establishing a direct drive connection between the forward carrier and the impeller member, said last mentioned means being effective when the holding means are released.

FOREST R. McFARLAND.